Patented Jan. 1, 1924.

1,479,387

UNITED STATES PATENT OFFICE.

RICHARD D. JORDAN AND JOHN H. HALL, OF HIGH BRIDGE, NEW JERSEY, ASSIGNORS TO TAYLOR-WHARTON IRON AND STEEL COMPANY, OF HIGH BRIDGE, NEW JERSEY, A CORPORATION OF NEW JERSEY.

METHOD FOR THE PRODUCTION OF MANGANESE STEEL.

No Drawing.   Application filed June 5, 1922.   Serial No. 566,142.

*To all whom it may concern:*

Be it known that we, RICHARD D. JORDAN and JOHN H. HALL, citizens of the United States, residing at High Bridge, in the county of Hunterdon and State of New Jersey, have invented a certain new and useful Method for the Production of Manganese Steel, of which the following is a specification.

The object of this invention is to provide for the rapid and continuous production of commercial manganese steel.

In practicing our invention we charge into the electric furnace manganese scrap of a nature and under conditions for effecting immediate current flow, whereupon we establish the required maximum current density and maintain it for the duration of the heat. When the scrap is of proper shape and size we get contact at once. Failing this, and in order to insure quick contact, we work the scrap around and we sometimes supply steel punchings or fine ferro-manganese in the vicinity of the electrodes.

Following the proper starting of the furance, we add approximately ten pounds of lime for every thousand pounds of charge, disposing the lime around the electrodes. If the scrap is rusty, the lime absorbs some of the rust and becomes readily fusible. If the scrap is free from rust we add a little silica sand to the lime to decrease its melting point. The lime, together with the rust on the scrap, or the addition of silica sand, forms the slag that protects the metal from oxidation. During the melting operation the slag absorbs small amounts of iron, manganese and silicon from the metal in the form of oxides and a considerable amount of magnesia from the bottom.

When the bath is melted we take a preliminary test for analysis. From the time of taking the specimen until the heat is tapped, we work the slag with a deoxidizing agent for the purpose and with the result of driving some of the manganese and iron, absorbed by the slag, back into the steel.

After getting a report on the preliminary test, we make the requisite additions to the steel, heat the latter rapidly to the required temperature, and then proceed to tap.

In all cases we add silicon to the steel, as we have found that manganese scrap, melted in the electric furnace loses a great proportion of its silicon which, if not replaced, results in a steel of inferior quality. We have found it desirable, and have secured excellent results, by having at least .50 per cent silicon in the final product.

If the carbon is on the high side of 1.25 per cent and the manganese is below 11.5 per cent, we make up our manganese and silicon by the addition of a low carbon silico-manganese. If the carbon is on the low side of 1.25 per cent, and the manganese is on the low side of 11.5 per cent, we increase our manganese by the addition of ferro-manganese and add ferro-silicon. If the manganese is 11.5 per cent or higher, we make no further manganese addition, but add ferro-silicon.

We put on full power at the start of the heat and keep it on until the heat is tapped, thus getting the steel out of the furnace in the shortest possible time, with a minimum power consumption and minimum wear on bricks, electrodes and bottom. We have found that if we reduce our power and work the slag for an extended period, there is nothing to be gained in the way of improved quality of the steel, and that the value of the ferro-manganese recovered from the slag is more than counterbalanced by the increased costs.

On tapping a heat we leave from three hundred pounds to five hundred pounds of molten metal in the furnace and charge the next heat. The scrap, which is thrown in first, is immersed in the molten metal which freezes and forms a solid mass that promotes the flow of current and enables us to get quick contacts. When the furnace is on single turn this practice does not apply to the first heat of the day, or, if it is on continuous operation, it does not apply to the first heat of the week, as we have found that the manganese scrap charged into a hot furnace and allowed to stand over night will lose a great deal of manganese by slow oxidation.

Having thus described our invention and the manner in which the same is to be performed, we claim,—

1. The herein described method for the rapid production of manganese steel in the electric furnace, which consists in introducing the necessary charge and priming it at or in the vicinity of the electrodes to insure quick contact and, having guarded against oxidizing conditions, applying full current density and maintaining it for the duration of the heat.

2. The herein described method for the rapid production of manganese steel, which consists in charging an electric furnace under conditions for effecting immediate current flow through the charge, establishing a non-oxidizing environment, and maintaining full current density from the time the heat is started until it is tapped.

3. The herein described method for the rapid production of manganese steel, which consists in charging an electric furnace under conditions for effecting immediate current flow through the charge, establishing a non-oxidizing environment by a slag forming addition, including approximately ten pounds of lime for each thousand pounds of charge, and maintaining full current density from the time the heat is started until it is tapped.

4. The herein described method for the rapid production of manganese steel in the electric furnace, which consists in charging the furnace with manganese scrap under conditions which tend to establish immediate current flow through the charge, and under non-oxidizing conditions, and maintaining full current density from the time the heat is started until it is tapped.

5. The herein described method for the rapid production of manganese steel in the electric furnace, which consists in charging the furnace with manganese scrap under conditions tending to establish immediate current flow through the charge, and under non-oxidizing conditions, maintainig full current density from the time the heat is started until it is tapped, sampling the heat for analytical test and adjusting the same as demanded by the test, and tapping the heat.

6. The herein described method for the rapid production of manganese steel in the electrical furnace, which consists in charging the furnace with manganese scrap under conditions tending to establish immediate current flow through the charge and under non-oxidizing conditions, effecting preliminary tests of the heat and making desirable corrections so that the final product will have a silicon content of at least .50 per cent, and tapping the heat.

7. In the continuous production of manganese steel in the electric furnace, that improvement which consists in retaining in the furnace a sufficient amount of molten metal from the previous heat to substantially unify the charge.

8. In the continuous production of manganese steel in the electric furnace, that improvement which consists in charging a furnace containing molten metal from the previous heat with sufficient material to solidify the charge.

9. The herein described method for the continuous production of manganese steel in the electric furnace, which consists in retaining enough of the previous heat to establish with the charge an uninterrupted current flow, completing the charge, and rapidly melting it by the continuous application of full current density.

10. The herein described method for the continuous production of manganese steel in the electric furnace, which consists in immersing the charge in molten metal forming a part of the previous heat, making the necessary slag forming addition, and rapidly melting under sustained full current density.

11. The herein described method for the continuous production of manganese steel in the electric furnace, which consists in charging an electric furnace containing sufficient molten metal from the previous heat to establish with the charge an uninterrupted current flow, and maintaining full current density until the heat is tapped.

12. The herein described method for the continuous production of manganese steel in the electric furnace, which consists in charging manganese scrap into an electric furnace containing sufficient molten metal from the previous heat to establish with the charge an uninterrupted current flow, applying full current density under substantially non-oxidizing conditions and maintaining it for the duration of the heat, effecting desirable changes in the analysis of the metal, and tapping such of the heat as is not required for the next charge.

13. The herein described method for the continuous production of manganese steel in the electric furnace, which consists in charging manganese scrap into an electric furnace containing sufficient molten metal from the previous heat to establish with the charge a substantially uninterrupted current flow, and under substantially non-oxidizing conditions, and maintaining full current density for the duration of the heat.

14. The herein described method for the rapid and continuous production of manganese steel in the electric furnace, which consists in effecting a charge of scrap and molten metal under substantially non-oxidizing conditions and under conditions for effecting rapid contact, and utilizing maximum current density to rapidly melt the charge.

15. The herein described method for the rapid and continuous production of manganese steel in the electric furnace, which consists in establishing a substantially solid charge capable of effecting rapid contact, rapidly melting the charge by a sustained application of full current density, and, before tapping, making the necessary addition so that the steel will have a minimum silicon content of substantially 0.50 per cent.

16. The herein described method for the rapid and continuous production of manganese steel in the electric furnace which consists in establishing a substantially solid charge capable of effecting rapid contact, and maintaining full current density until the heat is tapped.

17. The herein described method for the rapid and continuous production of manganese steel in the electric furnace, which consists in effecting a substantially unified charge of scrap and molten metal retained in the furnace from the previous heat and under conditions for effecting rapid contact, conducting the heat under conditions such that the ultimate product will have a silicon content of substantially .50 per cent, and tapping the heat.

18. The herein described method for the rapid production of manganese steel, which consists in charging an electric furnace with appropriate scrap under conditions for effecting quick contact and rapid melting, rectifying the bath in accordance with its carbon and manganese contents and so that the ultimate product will have a silicon content of substantially .50 per cent, and tapping the heat.

19. The herein described method for the rapid production of manganese steel, which consists in charging an electric furnace with appropriate scrap under conditions for effecting quick contact and under substantially non-oxidizing conditions, establishing full current density at the outset and maintaining the same for the duration of the heat, replacing the silicon lost in the melting and tapping the heat.

20. The herein described method for the rapid and continuous production of manganese steel, which consists in charging an electric furnace containing sufficient molten metal from the previous heat to establish, with the charge, conditions for effecting substantially uninterrupted current flow, rapidly melting with full current density, which is maintained throughout the heat, and then tapping, retaining some of the heat for the next charge.

21. The herein described method for the rapid and continuous production of manganese steel in the electric furnace, which consists in charging a hot furnace and rapidly melting with full current density, which is maintained for the duration of the heat and under substantially non-oxidizing conditions.

22. The herein described method for the rapid and continuous production of manganese steel in the electric furnace, which consists in charging a furnace hot from the previous heat under conditions for effecting quick contact, rapidly melting, and controlling the bath so that the ultimate product has a silicon content of .50 per cent.

23. The herein described method for the rapid and continuous production of manganese steel in the electric furnace, which consists in overlapping heats, and maintaining full current density throughout each heat.

24. The herein described method for the rapid and continuous production of manganese steel in the electric furnace, which consists in overlapping heats by utilizing a portion of the previous heat to establish with the charge a substantially uninterrupted current flow, and maintaining full current density for the duration of the heat.

25. The herein described method for the rapid and continuous production of manganese steel in the electric furnace, which consists in overlapping heats by utilizing a portion of one heat to establish with the next a substantially uninterrupted current flow, and, while guarding against the hazard of oxidation, applying full current density and maintaining it for the duration of the heat.

26. Manganese steel, consisting of the product of an electric furnace, having a silicon content of substantially .50 per cent.

27. The herein described method for the rapid and continuous production of manganese steel in the electric furnace, which consists in starting the operation with the requisite charge and a priming of ferromanganese at or in the vicinity of the electrodes to effect quick contact, and with a material capable under the influence of heat of protecting the charge from oxidation, applying full current density and maintaining it for the duration of the heat, partially tapping the heat, effecting a fresh charge, and rapidly melting as before.

In testimony whereof we affix our signatures.

RICHARD D. JORDAN.
JOHN H. HALL.